(12) United States Patent  (10) Patent No.: US 7,553,236 B2
Parra et al.  (45) Date of Patent: Jun. 30, 2009

(54) CASINO GAMING STATION

(76) Inventors: Anthony C. Parra, 516 Harlowe La., Naperville, IL (US) 60565; Debra L. Parra, 516 Harlowe La., Naperville, IL (US) 60565

( * ) Notice: Subject to any disclaimer, the term of this patent is extended or adjusted under 35 U.S.C. 154(b) by 1269 days.

(21) Appl. No.: 10/075,082

(22) Filed: Feb. 13, 2002

(65) Prior Publication Data

US 2003/0151198 A1  Aug. 14, 2003

(51) Int. Cl.
 *A63F 13/00* (2006.01)
(52) U.S. Cl. .................... 463/46; 273/281; 273/284; 273/287; 273/292; 273/309; 463/34; 463/40; 463/42
(58) Field of Classification Search ........... 463/11–13; 273/274, 292, 293, 294, 148 R, 309; 248/187.1, 248/186.2, 183.4, 183.2, 181.2, 123.11, 123.2, 248/168; 396/419, 427, 428, 429
See application file for complete search history.

(56) References Cited

U.S. PATENT DOCUMENTS

| 2,348,841 | A | * | 5/1944 | Oswald | 352/132 |
| 2,677,305 | A | * | 5/1954 | Oswald | 352/197 |
| 2,684,822 | A | * | 7/1954 | Odin | 248/179.1 |
| 2,760,744 | A | * | 8/1956 | Watrous | 248/123.2 |
| 2,847,904 | A | * | 8/1958 | Nosco | 353/79 |
| 2,882,790 | A | * | 4/1959 | Broms | 355/62 |
| 3,514,206 | A | * | 5/1970 | Harvey et al. | 355/67 |
| 3,608,462 | A | * | 9/1971 | Groshong | 108/20 |
| 3,643,345 | A | * | 2/1972 | Wilton et al. | 434/44 |
| 3,820,130 | A | * | 6/1974 | Cornelison et al. | 396/263 |
| 4,060,819 | A | * | 11/1977 | Bahnsen | 396/419 |
| 4,963,903 | A | * | 10/1990 | Cane | 396/428 |
| 5,384,609 | A | * | 1/1995 | Ogawa et al. | 396/419 |
| 5,449,138 | A | * | 9/1995 | Ciancio | 248/123.2 |
| D375,319 | S | * | 11/1996 | Johnson et al. | D16/202 |
| 5,726,706 | A | * | 3/1998 | Walsh | 348/151 |
| 5,735,742 | A | * | 4/1998 | French | 463/25 |
| 5,839,960 | A | * | 11/1998 | Parra et al. | 463/41 |
| 5,876,283 | A | * | 3/1999 | Parra et al. | 463/12 |
| 5,971,271 | A | * | 10/1999 | Wynn et al. | 235/380 |
| 5,978,028 | A | * | 11/1999 | Yamane | 348/373 |
| D424,087 | S | * | 5/2000 | Frick et al. | D16/203 |
| 6,116,597 | A | * | 9/2000 | Rowe et al. | 273/143 R |
| 6,154,131 | A | * | 11/2000 | Jones et al. | 340/540 |
| 6,270,404 | B2 | * | 8/2001 | Sines et al. | 463/12 |

(Continued)

OTHER PUBLICATIONS

Oxford English Dictionary Online; unitary, a. p. 1-4; abbreviations C, S (Second Edition 1989).*

*Primary Examiner*—John M Hotaling
*Assistant Examiner*—Werner Garner
(74) *Attorney, Agent, or Firm*—Robert L. Marsh

(57) ABSTRACT

A casino gaming station includes a free standing gaming table and a free standing canopy which can be positioned above the gaming table where the canopy is supported by a pedestal positioned adjacent to the table. The gaming table has an upper surface with markings thereon for use in the playing of one of the games of chance of a casino. The pedestal supports an upwardly extending vertical post with the upper end of the post extending horizontally outward of the pedestal and over the table. At the outer end of the vertical extension is the canopy having a motion video camera therein directed downward towards the surface of the table.

13 Claims, 3 Drawing Sheets

U.S. PATENT DOCUMENTS

| | | | |
|---|---|---|---|
| 6,299,534 B1 * | 10/2001 | Breeding et al. | 463/25 |
| 6,437,826 B1 * | 8/2002 | Arnold | 348/373 |
| 6,450,706 B1 * | 9/2002 | Chapman | 396/428 |
| 6,517,073 B1 * | 2/2003 | Vancura | 273/274 |
| 6,527,271 B2 * | 3/2003 | Soltys et al. | 273/148 R |
| 6,585,428 B1 * | 7/2003 | Wesselink et al. | 396/427 |
| 6,585,586 B1 * | 7/2003 | Romero | 463/12 |

\* cited by examiner

CASINO GAMING STATION

The present application relates to casino tables, the upper surfaces of which are used to conduct a game of the casino and, in particular, to an easily relocateable casino table and the associated facilities needed to carry out a casino game.

BACKGROUND OF THE INVENTION

The gaming area of a casino is normally divided into sections with each section offering a different game of chance to its patrons. Each section of the casino is, in turn, occupied by a plurality of gaming tables, with each gaming table offering an aesthetic appearance to enhance the attraction to patrons. Tables also include table security to protect the integrity of the game during the play and to some extent, to protect the dealer. The dealer is primarily responsible for providing table protection and game integrity, but in the absence of adequate surveillance cameras and the like, his efforts can be compromised by professional cheaters. Existing gaming tables are provided with various electronic devices, such as monitors positioned near each player which require the provision of various electrical hookups and the like. To accommodate the requirements of the gaming table, electrical hookups are provided through the floor in the general location of each of the tables.

The demand for the various games of a casino will change over time. A casino will at one time find the tables in a first section dedicated to a first game of chance all in use while only a fraction of the tables in a second section dedicated to a second game of chance are in use. At another time only a fraction of the tables of the first game will be in use while all the tables of the second game are in use. Under such circumstances, the space of a casino floor would be more efficiently used if the mix of tables allocated to the first and second games of chance could be readily increased or decreased to accommodate the preferences of the patrons. However, it is presently very difficult for a casino to reallocate the number of tables available for each of the games.

One method of altering the mix of tables allocated to the various games of chance has been to provide replaceable leaves for the upper surfaces of the tables such that the table can be converted from one game to another by replacing the leaves which form its upper surface as described in our prior patent 5,839,960. Replacing the leaves of the table will facilitate the changing from a first game to a second game where the table requirements of both the first and second games are approximately the same. For example, a blackjack table may be converted into a poker table by replacing the leaves of the upper surface. A roulette table, on the other hand, is not readily convertible to a craps table or a poker table.

One of factors which has inhibited casinos from readily changing the mix of tables on the gaming floor has been the need for surveillance to maintain the integrity of the game being played on the table. In the past surveillance has been carried out by providing cameras in the ceiling of the establishment. The size and configuration of various gaming tables may differ greatly from game to game, and therefor the surveillance requirements of the various games are correspondingly different from game to game. The surveillance needs of a crap table, for example are different from the needs of a roulette table, and any effort to change the mix between two such types of tables will also require the reconfiguration of the cameras needed for surveillance. It would, therefore, be desirable to provide a method whereby the mix of tables dedicated to each game of a casino could be easily altered without compromising the need for adequate surveillance or aesthetic qualities which protect and attract patrons.

SUMMARY OF THE INVENTION

Briefly, the present invention is embodied in a casino gaming station comprising a free standing gaming table and a free standing canopy which can be positioned above the gaming table where the canopy is supported by a pedestal positioned adjacent to the table. The gaming table has an upper surface with markings thereon for use in the playing of one of the games of chance of a casino. The markings further include designated play stations with each play station useable by one of the participants of the game of chance, and a dealer station for use by representative of the house in the playing of the game.

The table may have any of a number of additional amenities including monitors which display activities elsewhere in the casino for the further entertainment of the players and a telephone to permit players to make reservations for other activities without leaving the table.

The pedestal supports an upwardly extending vertical post with the upper end of the post extending horizontally outward of the pedestal and over the upper surface of the table. At the outer end of the vertical extension is the canopy. Within the canopy is a motion video camera, the lens of which is directed downward towards the surface of the table for recording the play of the game of chance on the upper surface thereof. The pedestal and canopy include means for transmitting video signals received from the camera to a remote supervisor's office for viewing the action on the upper surface of the game table. The outer surface of the canopy, which is visible by patrons in the casino has means, such as a video display, for projecting advertising material and the like for notifying patrons of the type of game being played at the gaming station.

BRIEF DESCRIPTION OF THE DRAWINGS

A better and more complete understanding of the present invention will be had after a reading of the following detailed description taken in conjunction with the drawings wherein.

DETAILED DESCRIPTION OF THE PREFERRED EMBODIMENT

Figure 1:
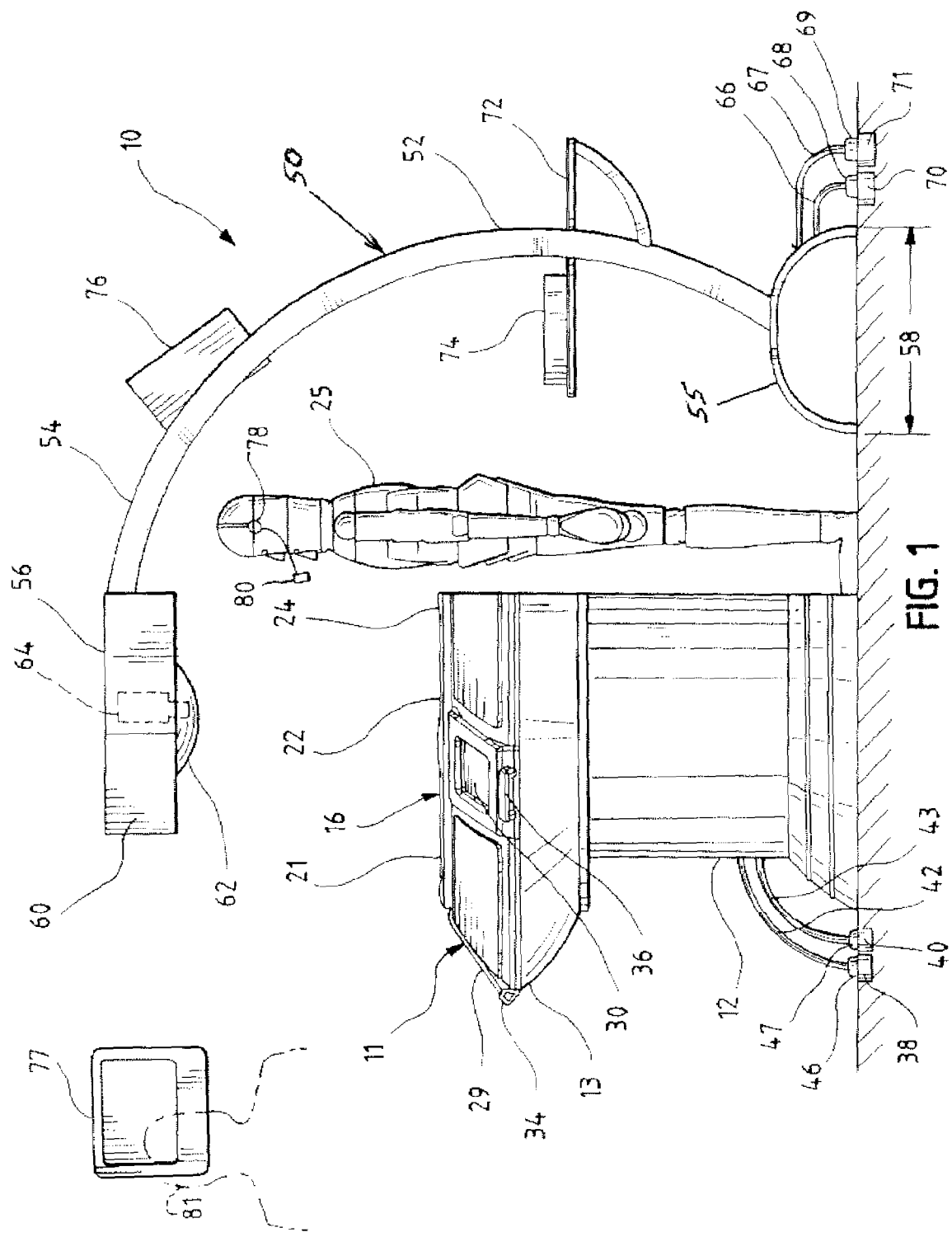
FIG. 1 is a side elevational view of a gaming table, pedestal and canopy in accordance with the present invention.
Figure 2:
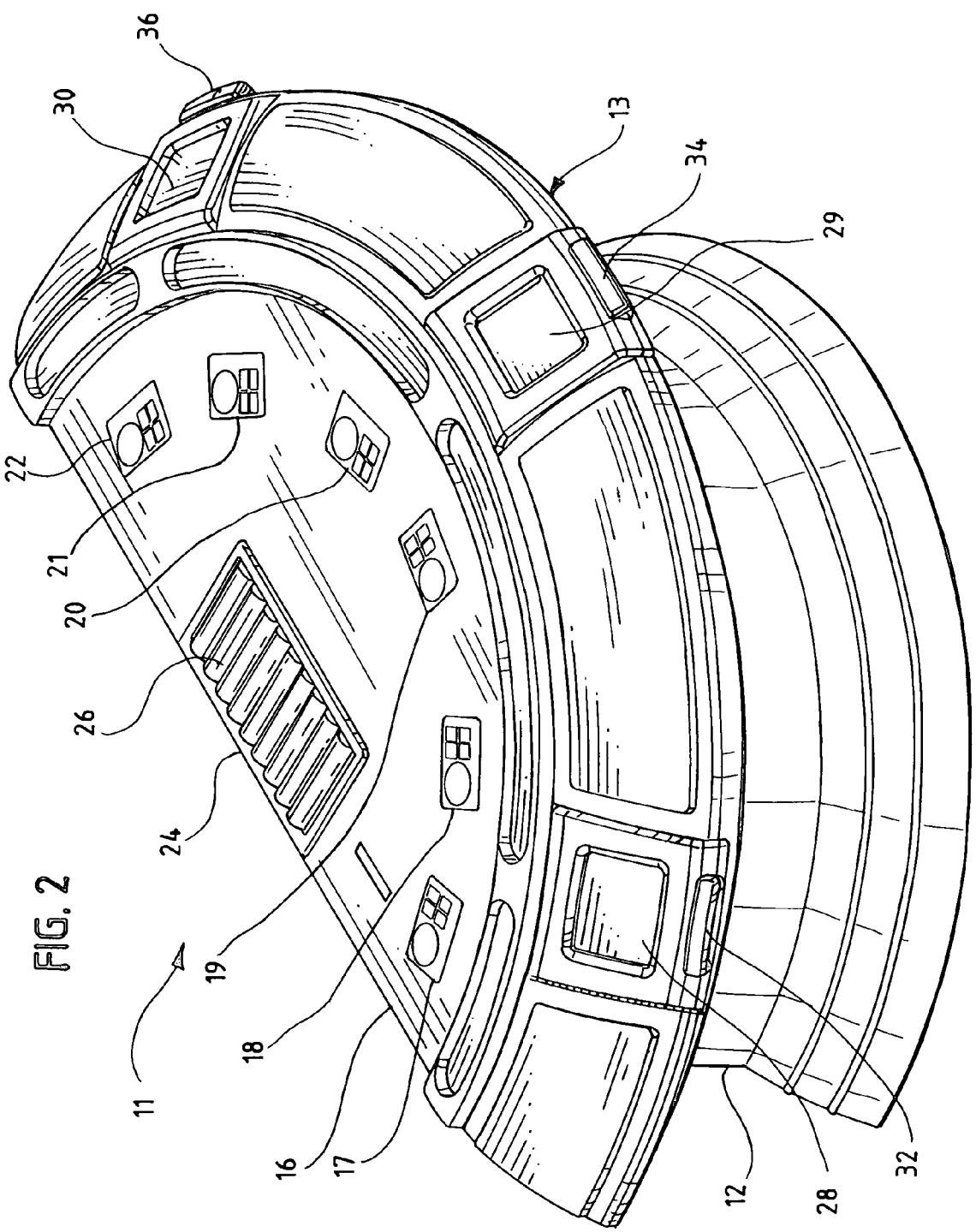
FIG. 2 is an isometric view of the table depicted in FIG. 1.
Figure 3:
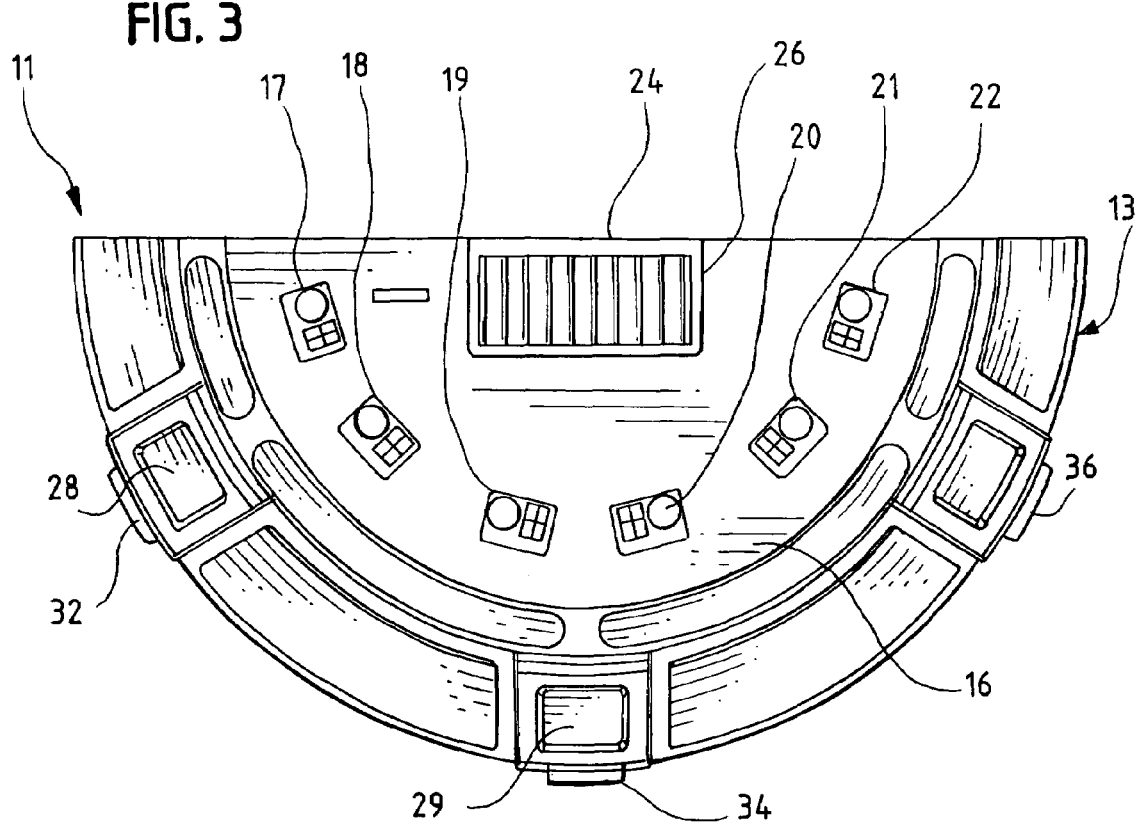
FIG. 3 is a top elevational view of the table shown in FIG. 2.
Figure 4:
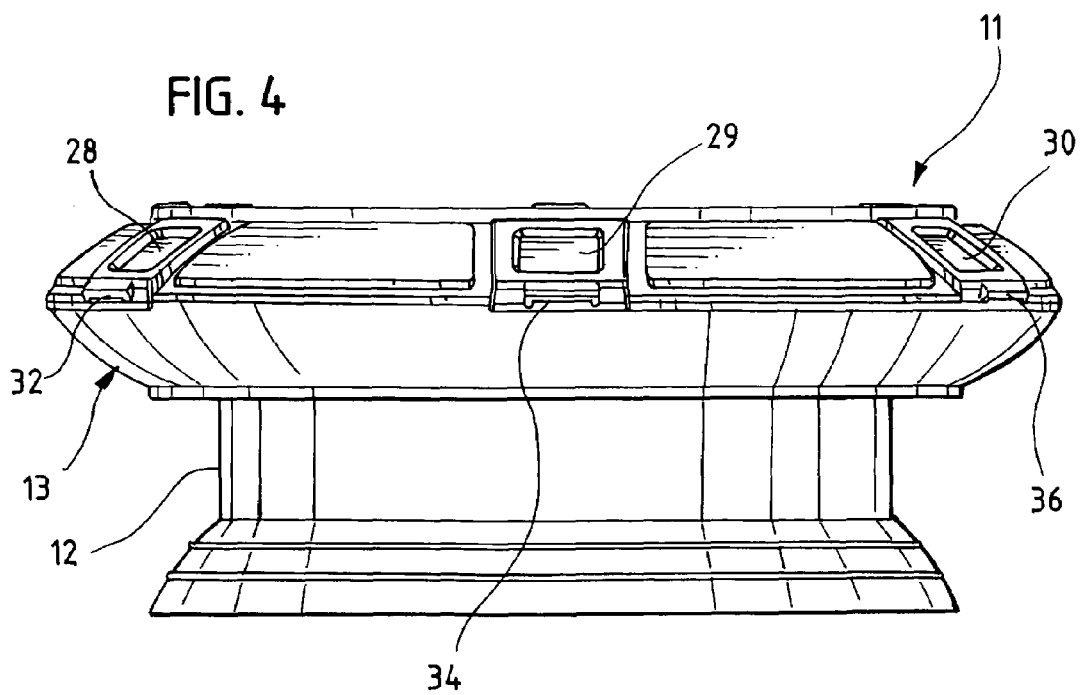
FIG. 4 is a front elevational view of the table shown if FIG. 2.

Referring to FIGS. 1 through 4, a gaming station 10 includes a table 11 for use in a casino is supported on an enlarged pedestal 12 across which is an overhanging top 13. The top 13 has an elevation and overhang suitable for use by a plurality of patrons participating in the game, not shown, who sit on suitably chairs, not shown.

The upper surface 16 of the top 13 has markings thereon to designate a plurality of play stations 17, 18, 19, 20, 21, 22, each of said play stations for use by one of the participants in the game at the table. In one embodiment of the inventions, each of the play stations 17, 18, 19, 20, 21, 22 are numbered (bearing numbers 1 through 6) and each numbered play station is further identified by a caricature, such as the caricature of an animal. The upper surface 16 has further markings to designate a dealer station 24 for use by a dealer 25, and markings as needed for use in the play of the game of the table, not shown. A retainer 26 is positioned near the dealer station 24 for retaining chips needed in the play of the game. The periphery of the top 13 includes a plurality of video screens 28, 29, 30 which permit patrons participating in the game to view activities elsewhere in the casino. The screens 28, 29, 30 make use of touch screen technology to permit participants in the game to interact with activities elsewhere in the casino. The table top 13 may also be provided with a plurality of telephones 32, 34, 36, the phones connectable by jacks within the pedestal of the table, not shown, to enable participants to make reservations and other commitment without leaving their play station.

The table 11 includes cables 42, 43 with connectors 46, 47 at the ends thereof which are received in sockets 38, 40 in the floor of the casino for providing electrical power to the table 11 and communication to the video screens 28, 29, 30 and to the telephone jacks, not shown.

Positioned near the table 11 is a pedestal 50 supporting an upwardly extending vertical post 52, the upper end of which supports a horizontally outwardly extending portion 54 at the end of which is a canopy 56. The pedestal 50 is depicted in FIG. 1 as a unitary member having an arcuate configuration extending from the post 52 to the horizontal extension 54, however, the post 52 and extension 54 may have any of a number of configurations within the spirit of the invention. The pedestal 50 is provided with a base 55 having sufficient weight and has sufficient width 58 to adequately support the canopy 56 over the center of the upper surface 16 of the table 11 while the pedestal 50 is positioned sufficient far from the base 12 of the table 11 so as to not interfere with the activities of the patrons or the dealer who are engaged in the play of the game. The canopy 56 has an outer surface 60 which is provided with an LED display, or any other means, for projecting advertising material which can be seen by patrons passing the casino game station 10.

Centrally located along the lower surface of the canopy 56 is a transparent dome 62 into which is fitted a video camera 64. Cables 66, 67 for providing power to the video camera 64 and video output signal extend through the post 52 and extension 54 to the pedestal 50 and have connectors 68, 69 at the distal end thereof for connecting into sockets 70, 71 in the floor of the casino. The output from the video camera 64 can therefore be viewed by a supervisor in a remote location in the casino to detect cheaters participating in the game.

The post 52 also includes a table 72 thereon, the upper surface of which can be used as best suits the dealer, but is depicted as having a retainer 74 for retaining extra chips so as to be readily accessible to the dealer 25. A monitor 76 on the post 52 projects a view of the game being played on the upper surface 16 of the table 11 as seen through the eyes of video camera 64 such that patrons can see the same view of the game seen by supervisors in the remote location.

It should be appreciated that the video camera 64 could be powered by batteries and that the cable 66 and connectors 68, 70 can be eliminated by the provision of a cellular phone system or other wireless system for transmitting the view from the video camera 64 to a second monitor 77 viewed by a supervisor in a remote location. In similar fashion, the electronics within the table 11 may also be powered by batteries such that the table 11 and the canopy 56 are freely moveable without requiring the connection of cables as depicted and described above.

The table of the present invention is best used. in conjunction with a headset 78 and a microphone 80 for maintaining audio communication with a remote supervisor 81 and with other dealers in the casino.

Neither the table 11 nor the pedestal 50 are secured to the floor of the casino and, therefore, readily moveable from location to location. A table 11 with an upper surface 16 dedicated to a first game, for example poker, it can be easily removed and replaced by a second table 11 with an upper surface 16 dedicated to a second game, for example craps, such that the mix of the tables of a casino floor can be easily changed. The promotional material projected on the outer surface 60 of the canopy 56 will inform patrons in the casino of the game being played on the upper surface 16 of the table 11.

The play of a game on a gaming station 10 can be readily changed by first replacing the table 11 dedicated to a first game with the table 11 dedicated to a second game. If the space demands of the two games are substantially the same the advertising material being projected on the outer surface 60 of the pedestal 50 and canopy 56 at the site can be changed from that related to the first game to that related to the second game. If, on the other hand, the table requirements of the second game differ greatly from those of the first game, a pedestal and canopy 56 suitable for use with the table of the second game can be substituted for that used with the first game. As can be seen, the present invention enables the operators of a casino to readily change the mix of tables to accommodate the interests of patrons to thereby more efficiently use the space of the casino floor.

While the present invention has been depicted with respect to a single embodiment, it will be appreciated that many modifications and variations can be made without departing from the true spirit and scope of the invention. It is, therefore, the intent of the appended claims to cover all such variations and modifications which fall within the true spirit and scope of the invention.

What is claimed:

1. A casino gaming station comprising in combination
a table having an upper surface,
said upper surface having markings thereon for use in the playing of a game of chance,
a plurality of play stations designated on said upper surface with each of said play stations for use by one player participating in said game of chance,
a dealer station designated on said upper surface,
a pedestal independent of said table,
said pedestal positioned near said table,
said pedestal including a base and a unitary member attached thereto, said unitary member having a first portion extending vertically from said base,
said vertically extending first portion having an upper end, and
a horizontal second portion of said unitary member attached to said upper end of said first portion and extending therefrom,
said horizontal second portion having an outer end,
a canopy at said outer end of said horizontal second portion,
said canopy positioned over said table, and
a motion video camera positioned in said canopy to record the playing of a game on said table,
said motion video camera directed towards said upper surface of said table to provide a video of the play of said game of chance on said upper surface.

2. A casino gaming station in accordance with claim 1 and further comprising a headset for use by the dealer connected to a supervisor at a remote location to facilitate communication between said supervisor and said dealer.

3. A casino play station in accordance with claim 1 wherein said canopy includes means for projecting advertising material visible to the patrons near said table.

4. A casino play station in accordance with claim 1 wherein said table is further provided with a socket for attachment to a telephone for use by patrons.

5. A casino game in accordance with claim 1 and further comprising a video display connected to said motion video camera positioned in a remote location for viewing by a supervisor.

6. A casino play station in accordance with claim 1 and further comprising a video display on said pedestal for projecting the play of the game on said table as recorded by said motion video camera, said display oriented so as to be visible by the patrons playing at said table.

7. A casino play station in accordance with claim 1 and further including a tray on said pedestal.

8. A casino play station in accordance with claim 7 wherein said tray is filled with a retainer for retaining extra chips for use by the dealer.

9. A pedestal for use with a casino gaming table having a plurality of play stations thereon for use by players of the game of the table, said pedestal comprising a base, a unitary member extending vertically from said base, said unitary member having a vertical first portion with an upper end, and a horizontal second portion of said unitary member extending from said upper end of said vertical first portion, said horizontal second portion having an outer end, a canopy at said outer end of said horizontal second portion, said canopy having an elevation suitable for positioning over said table, and a motion video camera positioned in said canopy to record the playing of a game on said table, said motion video camera directed towards said upper surface of said table to provide a video of the play of said game of chance on said upper surface.

10. A pedestal in accordance with claim 9 and further comprising a video display connected to said motion video camera positioned in a remote location for viewing by a supervisor.

11. A pedestal in accordance with claim 9 and further comprising a video display on said pedestal for projecting the play of the game on said table as recorded by said motion video camera, said display oriented so as to be visible by the patrons playing at said table.

12. A pedestal in accordance with claim 9 and further including a tray on said pedestal.

13. A pedestal in accordance with claim 12 wherein said tray is fitted with a retainer for retaining extra chips for use by the dealer.

* * * * *

UNITED STATES PATENT AND TRADEMARK OFFICE
CERTIFICATE OF CORRECTION

| | | |
|---|---|---|
| PATENT NO. | : 7,553,236 B2 | Page 1 of 1 |
| APPLICATION NO. | : 10/075082 | |
| DATED | : June 30, 2009 | |
| INVENTOR(S) | : Anthony C. Parra and Debra L. Parra | |

It is certified that error appears in the above-identified patent and that said Letters Patent is hereby corrected as shown below:

In column 1 line 53, after "One" delete "of factors" and substitute --factor--

In column 2 line 15, after "by" insert --the--

In column 2 line 48, after "shown" delete "if" and substitute --in--

In column 5 line 24, after "is" delete "filled" and substitute --fitted--

Signed and Sealed this

Tenth Day of November, 2009

David J. Kappos
*Director of the United States Patent and Trademark Office*